US006813657B2

(12) United States Patent
Kyoung

(10) Patent No.: US 6,813,657 B2
(45) Date of Patent: Nov. 2, 2004

(54) APPARATUS FOR PROCESSING A BIT STREAM

(75) Inventor: Seung-June Kyoung, Kyoungki-do (KR)

(73) Assignee: Hyundai Electronics Industries Co., Ltd., Kyoungki-Do (KR)

( * ) Notice: Subject to any disclaimer, the term of this patent is extended or adjusted under 35 U.S.C. 154(b) by 350 days.

(21) Appl. No.: 09/931,198

(22) Filed: Aug. 16, 2001

(65) Prior Publication Data

US 2002/0025003 A1 Feb. 28, 2002

(30) Foreign Application Priority Data

Aug. 31, 2000 (KR) ........................................ 2000-51339

(51) Int. Cl.[7] .................................................. G06F 3/00
(52) U.S. Cl. .......................... 710/52; 712/300; 708/209
(58) Field of Search ........................... 710/52; 708/209; 712/300

(56) References Cited

U.S. PATENT DOCUMENTS 5,526,296 A * 6/1996 Nakahara et al. ........... 708/209
5,619,715 A * 4/1997 Dinkjian et al. ............ 712/300
5,822,620 A * 10/1998 Malik et al. ................ 712/300
5,835,793 A * 11/1998 Li et al. ...................... 712/300
6,065,107 A * 5/2000 Luick .......................... 712/32
2001/0020266 A1 * 9/2001 Kojima et al. .............. 712/225

* cited by examiner

*Primary Examiner*—Jeffrey Gaffin
*Assistant Examiner*—David Martinez
(74) *Attorney, Agent, or Firm*—Marshall, Gerstein & Borun LLP

(57) ABSTRACT

A bit stream processing apparatus is provided which stores a bit stream in a circular buffer without separately storing a header and data of the bit stream. The bit stream processing apparatus includes: a circular buffer for storing a transmitted bit stream; a first register for indicating a first read point of the bit stream stored in the circular buffer; a first backup register for backing up data stored in the first register; a second register for storing the number of bits to be read from the circular buffer; an adder for adding the data stored in the second register and data stored in a second register; a controller for determining the number of bits to be shifted in response to the output of the adder; a third register for storing data indicative of a number of bits to be ignored from the first read point; and a second backup register for backing up data stored in the third register.

15 Claims, 7 Drawing Sheets

APPARATUS FOR PROCESSING A BIT STREAM

TECHNICAL FIELD

A bit stream processing apparatus for storing a bit stream in a circular buffer without separately storing a header and data of the bit stream is disclosed.

DESCRIPTION OF THE RELATED ART

Generally, an apparatus for processing a bit stream that is coded based on a frame sequentially stores the bit stream into a buffer and then processes the bit stream. Since the bit stream stored in the buffer is not aligned based on a byte or a word, and the number of bits required to process the bit stream is different for different cases, an aligner is needed for aligning the required bits.

FIG. 1 is a diagram showing a moving pictures expert group (MPEG) layer 3 audio frame format. As shown in FIG. 1, when the bit stream is coded based on a frame, a portion of the i-th frame data is stored in an unused portion of the (i−1)-th frame. Here, a pointer MB contained in a header $H_i$ of the i-th frame $F_i$ has a value identical to or smaller than zero and indicates a starting point of the i-th frame data stored in the (i−1)-th frame $F_{i-1}$.

For processing such a bit stream, additional hardware is needed for dividing the buffer into a header buffer and a data buffer and for decoding a header of the inputted bit stream to classify it as a header or as data. As a result, the design of the bit stream processing unit is very complicated. Additionally, since different hardware is needed for different types of bit streams, a newly designed bit stream processing unit is required for processing each new type of bit stream.

SUMMARY OF THE DISCLOSURE

An apparatus is provided for processing a bit stream. The apparatus includes a circular buffer for storing a transmitted bit stream; a first register for storing data indicating a first read point of the bit stream stored in the circular buffer; and a first backup register for backing up the data stored in the first register. The apparatus also includes a second register for storing data indicating a number of bits to be read from the circular buffer; a third register for storing data indicative of the number of bits to be ignored from the read point; and a second backup register for backing up the data stored in the third register. In addition, the apparatus is provided with an adder for adding the data stored in the second register and the data stored in the third register; and a controller responsive to the adder to determine a number of bits to be shifted to read desired data from the circular buffer.

An apparatus is also provided for reading data from a circular buffer storing data in a plurality of memory words. The apparatus includes a first storage device for storing data indicative of a desired number of bits to be read; a second storage device for storing data indicative of a first bit to be read in a first memory word; and a shifter for receiving data stored in the first memory word and data stored in the second memory word located adjacent the first memory word in the circular buffer. The apparatus also includes a logic circuit in communication with the first and second storage devices for controlling the shifter to shift a number of bits specified by the data in the first and second storage devices to align the data in the shifter in a read position.

An apparatus is also provided for reading data from a circular buffer storing data in a plurality of memory words which includes a first masking circuit and a second masking circuit. The first masking circuit receives data contained in at least two memory words of the circular buffer. The at least two memory words include data to be read. When a rightmost bit of the received data is not part of the data to be read, the first masking circuit outputs a subset of the received data which includes at least the data to be read but excludes at least the rightmost bit. The second masking circuit masks unwanted bits from the output of the first masking circuit.

Further, a method is provided for reading data from a circular buffer storing data in a plurality of memory words. The method comprises the steps of: identifying at least one of the memory words containing data to be read; identifying a number of bits to be read; identifying a first bit to be read; retrieving all data in the memory words of the circular buffer storing data to be read; inputting the retrieved data to a shifter; summing the number of bits to be read with a number of bits to be ignored adjacent the first bit to be read to develop a sum; subtracting the sum from a predetermined number to determine a shift amount; shifting the data in the shifter by the shift amount to remove unwanted bits adjacent a last bit to be read; masking unwanted bits adjacent the first bit to be read; and outputting the bits to be read.

BRIEF DESCRIPTION OF THE DRAWINGS

The following description makes reference to the accompanying drawings, in which.

DETAILED DESCRIPTION OF PREFERRED EXAMPLES

Figure 1:
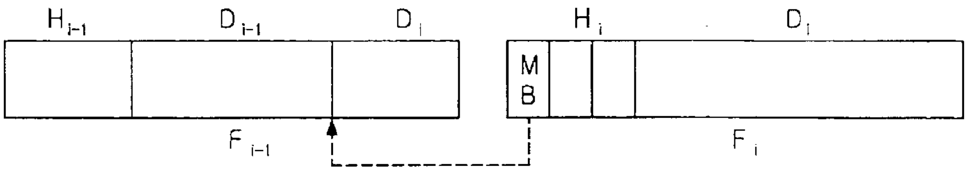
FIG. 1 (PRIOR ART)
FIG. 1 is a diagram showing a moving pictures expert group (MPEG) layer 3 audio frame format.
Figure 2:
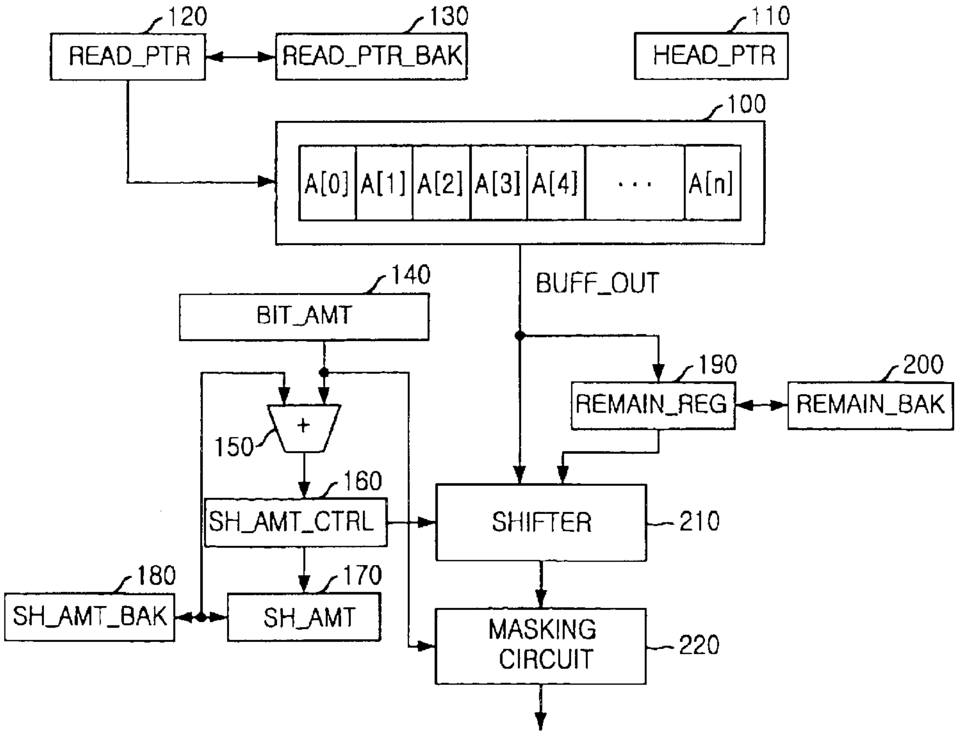
FIG. 2 is a block diagram illustrating a bit stream processing unit constructed in accordance with the teachings of the present invention.

FIG. 2 is a block diagram illustrating a bit stream processing unit constructed in accordance with the teachings of the present invention. The bit stream processing unit of FIG. 2 includes a circular buffer 100, a head pointer register 110, a read pointer register 120, a read pointer backup register 130, a bit amount register 140, an adder 150, a shift amount controller 160, a shift amount register 170, a shift amount backup register 180, a remaining register 190, a remaining backup register 200, a shifter 210 and a masking circuit 220.

The circular buffer 100 stores a transmitted bit stream. The head pointer register 110 stores information indicating an address of the circular buffer 100 in which the transmitted bit stream is to be stored.

The read pointer register 120 indicates a memory word (X) of the bit stream stored in the circular buffer 100 wherein reading is to begin. The read pointer backup register 130 is used to backup the data stored in the read pointer register 120.

The bit amount register 140 stores the number of bits to be read from the circular buffer 100. The adder 150 adds the number of the bits stored in the bit amount register 140 and the number of bits to be ignored from the beginning of the memory word identified by the data in the read point register 120.

The shift amount controller 160 determines the amount of bits to be shifted in response to an output of the adder 150 to properly align the bits to be read. The shift amount register 170 stores data indicative of the number of bits to be ignored from the beginning of the memory word that is identified by the read point register 120. The shift amount backup register 180 is used to backup data stored in the shift amount register 170.

The remaining register 190 stores data from a memory word (X−1) of the bit stream in the circular buffer 100 adjacent the memory word (X) identified by the data in the read pointer register 120. The circular buffer 100 and the remaining backup register 200 are used to backup data stored in the remaining register 190.

The shifter 210 shifts data BUFF_OUT, which is stored in the memory word (X) of the circular buffer 100 indicated by the read pointer register 120 and data, which is stored in the remaining register 190 (i.e., memory word (X−1)), by a shift amount outputted from the shift amount controller 160 to thereby align the bits in a right direction. The masking circuit 220 masks unwanted bits to zero in response to a value stored in the bit amount register 140.

As shown in FIG. 2, since the illustrated bit stream processing unit includes respective backup registers 130, 180 and 200 for respective registers 120, 170 and 190, the bit stream can be read out a second time from a specific point when previous read data is stored in the backup registers.

Figure 3:
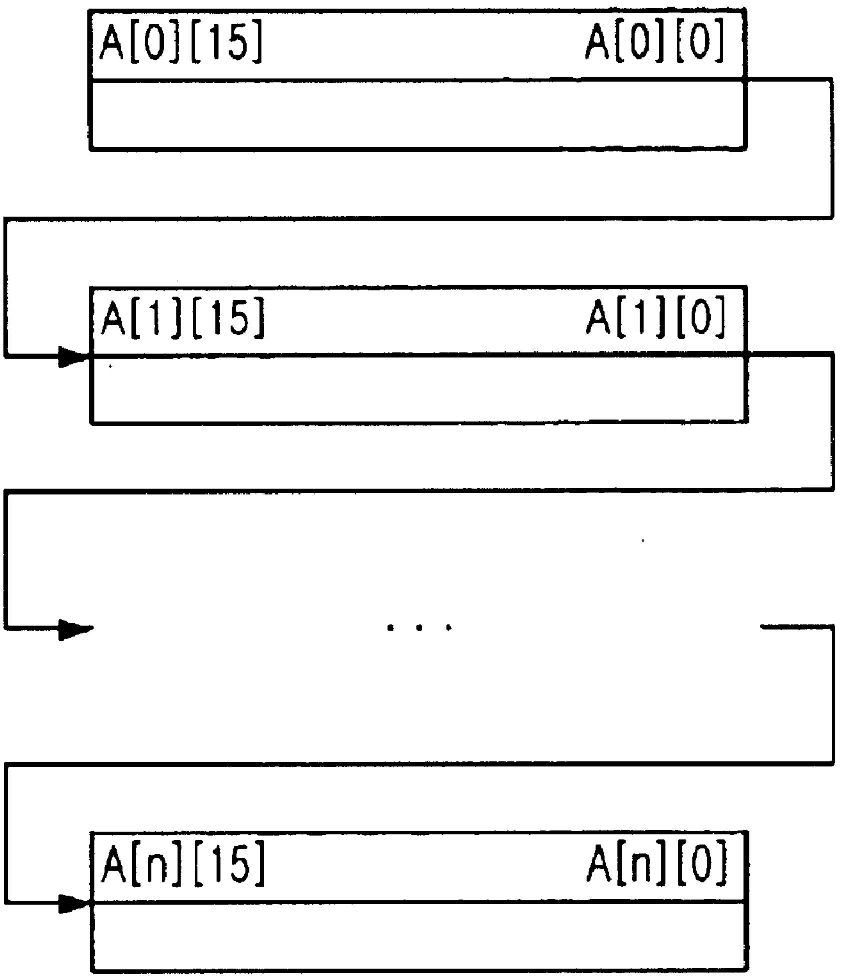
FIG. 3 is a diagram illustrating a sequence of transmitted bits in a circular buffer.

First, it is assumed that one memory word (A[n]) of the circular buffer 100 includes 16 bits (e.g., A[n][15],. . ., A[n][14], . . . , A[n][0]). It is also assumed that the bit stream processing unit shown in FIG. 2 can align a maximum of 16 bits. FIG. 3 is a diagram illustrating a sequence of transmitted bits in the circular buffer 100.

The illustrated bit stream processing unit has two operational modes, namely, a first read mode and a second read mode. In the first read mode, a bit stream that is once read cannot be again read out. On the contrary, in the second read mode, a bit stream that is once read can be again read out.

In the first read mode, each value of the registers 120, 170 and 190 and each value of their respective backup registers 130, 180 and 200 are simultaneously updated.

In the second read mode, when each value of the registers 120, 170 and 190 is updated, each value of their respective backup registers 130, 180 and 200 is not updated.

Figure 4:
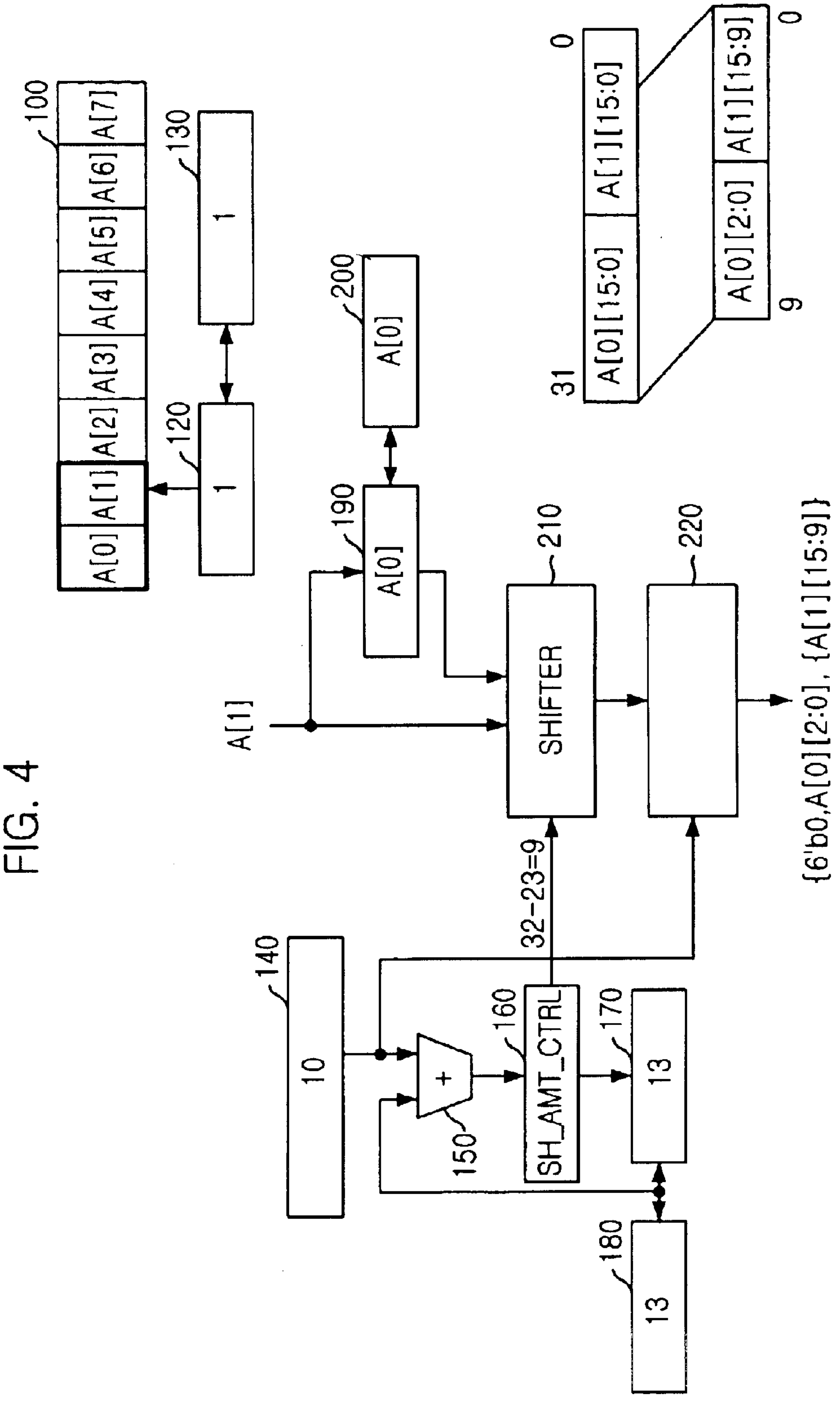
FIG. 4 is a block diagram for explaining an operation wherein 10 bits are read out in the first read mode of the bit stream processing unit shown in FIG. 2.

FIG. 4 is a block diagram for explaining an operation wherein 10 bits are read out in the first read mode of the bit stream processing unit shown in FIG. 2. Here, it is assumed that the 10 bits to be read out are the 3 least significant bits (LSB) in memory word A[0] of the circular buffer 100 (e.g., A[0][2:0]) and the 7 most significant bits (MSB) in memory word A[1] (e.g., A[1][15:9]).

As shown in FIG. 4, since the read pointer register 120 points to an address of A[1], the remaining register 190 stores the 16 bits from memory word A[0]. Furthermore, the bit amount register 140 stores a value of 10 as the number of bits to be read, and the shift amount register 170 stores 13 bits as a consumed state because, in this example, we are not interested in the bits at address A[0][15:3].

Hereinafter, the operation of reading out 10 bits will be described in detail. The data stored in memory words A[0] and A[1] are input into the shifter 210, and the shift amount controller 160 outputs a value of 9 as a shift amount to the shifter 210. Here, the value of 9 is obtained by [32-(BIT_AMT+SH_AMT)], where BIT_AMT and SH_AMT denote values stored in the bit amount register 140 and the shift amount register 170, respectively. Thereafter, the shifter 210 shifts the 32 bits of A[0] and A[1] to the right in response to the shift amount of 9 to thereby output 16 bits A[0][8:0]) and A[1][15:9]. Then, the masking circuit 220 masks 6 upper bits to zero and outputs {6'b0 (i.e., six upper bits zero), A[0][2:0], A[1][15:9]} as a final result.

Figure 4A:
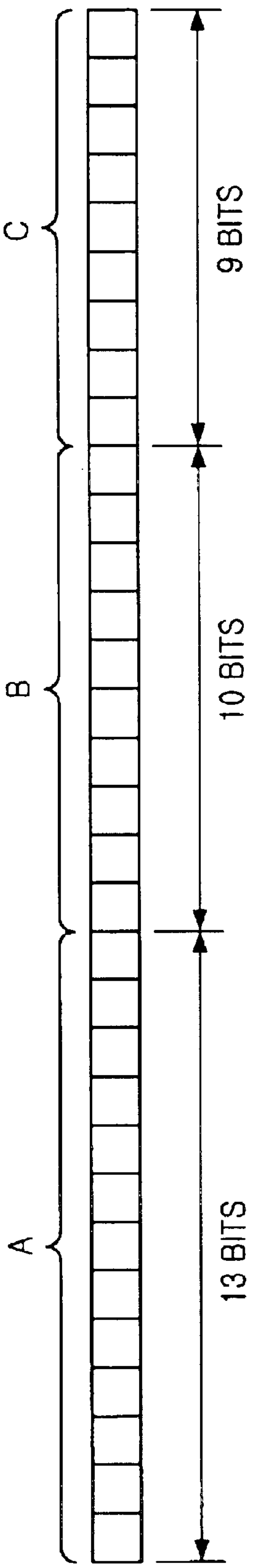
FIG. 4A is a schematic illustration showing a representative block of data received by the shifter 210.

The operation of the shift amount controller is explained in further detail in FIG. 4A. In particular, since we know the shifter 210 is to receive two memory words of data, namely, A[0] and A[1], and since we know each of those words is 16 bits long, the shifter 210 initially receiving 32 bits of data. We know from the shift amount register 170 that the data read is not to include the first 13 bits of data (labeled "A" in FIG. 4A) received at the shifter 210 (i.e., the read is to start at the 14th bit of memory word A[1]). We also know from the bit amount register 140 that the read is only to include 10 bits of data labeled "B" in FIG. 4A. Therefore, we know that the last 9 bits (32−13−10=9 bits labeled "C" in FIG. 4A received by the shifter are not to be included in the read. As a result, the shifter 210 shifts the received data 9 bits to the right to thereby place the ten bits of interest in the rightmost position of the shifter 210 (i.e., the "read position"). The masking circuit 220, which is adapted to only receive the rightmost word (i.e., the rightmost 16 bits) of the shifter 210, then zeros out the 6 upper bits of the word received from the shifter 210 based on the data stored in the bit amount register (i.e., 16 bits received from the shifter minus ten bits to be read equals 6 bits to be zeroed).

Figure 5:
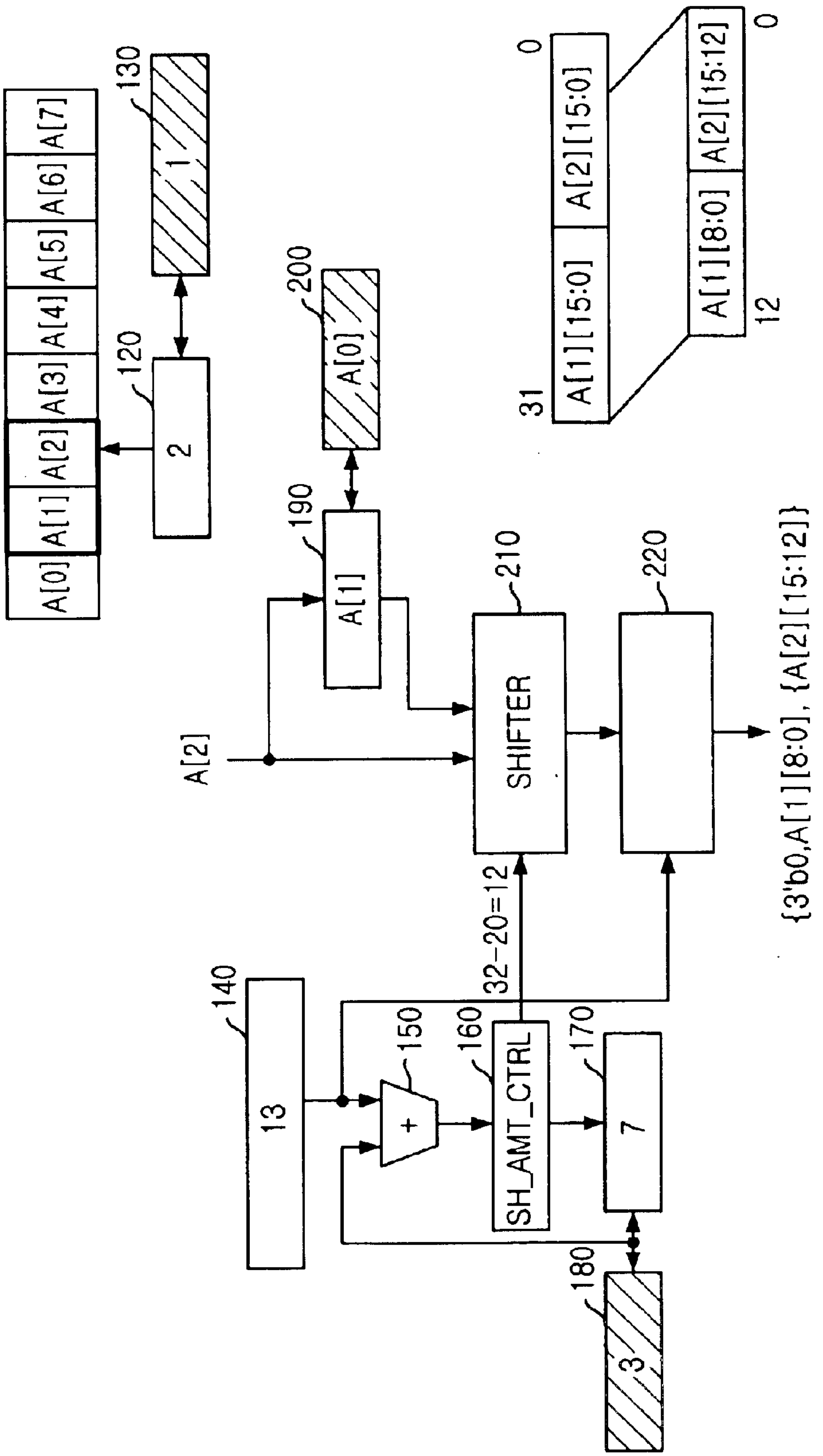
FIG. 5 is a block diagram for explaining an operation wherein 13 bits are read out in the second read mode of the bit stream processing unit shown in FIG. 2.

FIG. 5 is a block diagram for explaining an operation wherein 13 bits are read out in the second read mode of the bit stream processing unit shown in FIG. 2. The entire operation in FIG. 5 is the same as in FIG. 4, but in FIG. 5 (i.e., the second read mode) the backup registers 130, 180 and 200 respectively store the previous state for the registers 120, 170 and 190.

Figure 6:
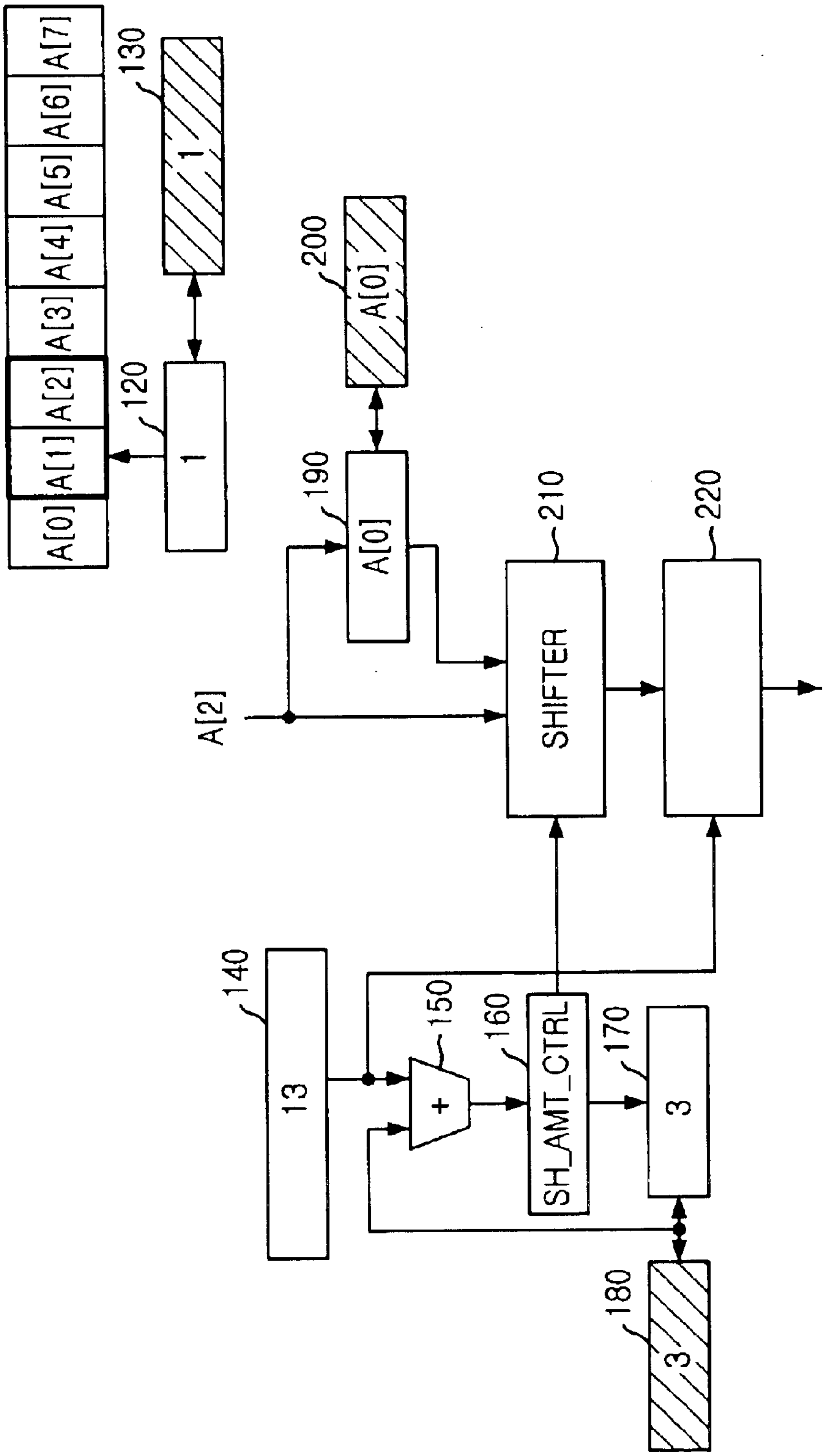
FIG. 6 is a diagram illustrating each state of respective registers and backup registers in the bit stream processing unit when the operational mode is changed from the second read mode to the first read mode.

FIG. 6 is a diagram illustrating each state of the registers 120, 170 and 190 and the backup registers 130, 180 and 200 in the bit stream processing unit of FIG. 2 when the operational mode is changed from the second read mode shown in FIG. 5 to the first read mode. In particular, the data in backup registers 130, 180 and 200 is written to corresponding registers 120, 170 and 190.

Referring to FIG. 6, the values of the backup registers 130, 180 and 200 are restored to the respective registers 120, 170 and 190. Therefore, it is possible to repeat the previous data read when the operational mode is changed from the first mode to the second read mode.

Figure 7:
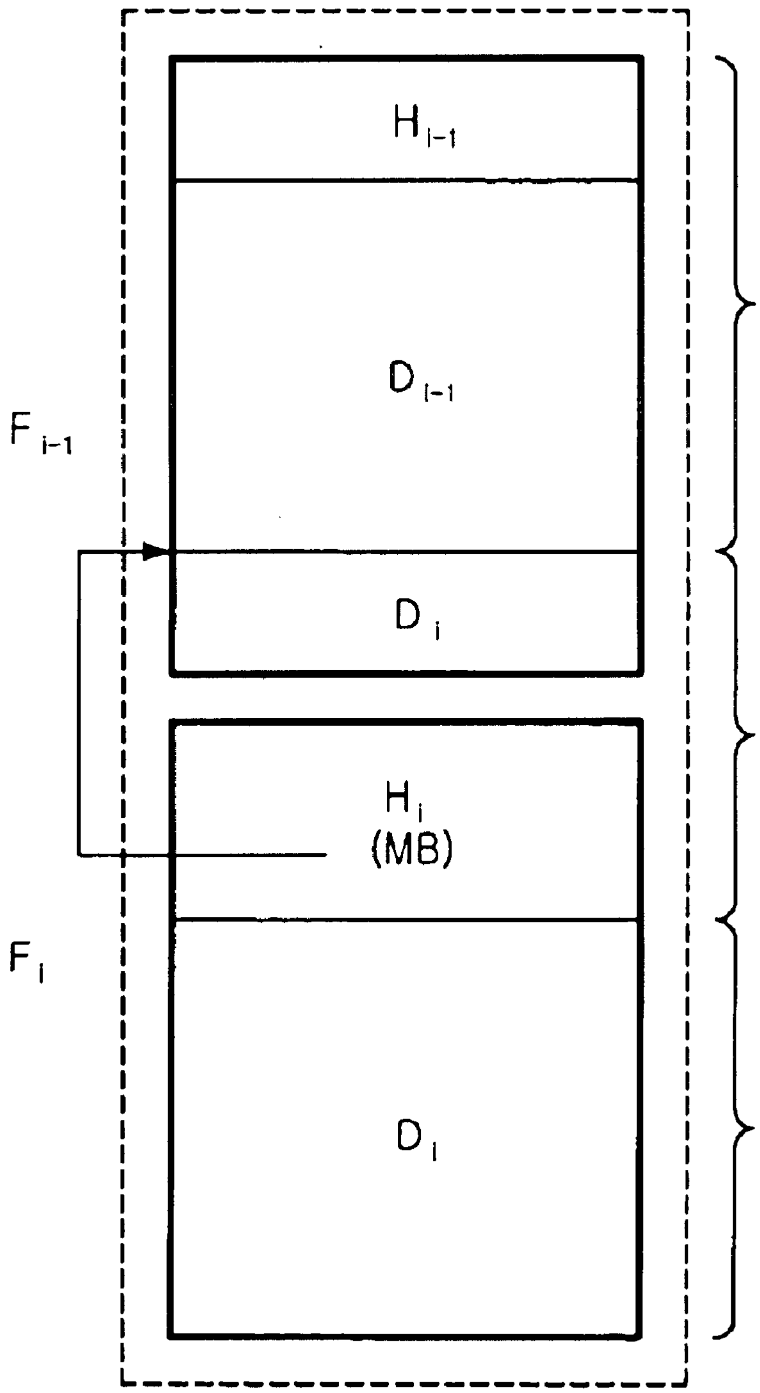
FIG. 7 is a diagram illustrating an MPEG layer 3 audio frame format stored in the circular buffer.

FIG. 7 is a diagram illustrating an MPEG layer 3 audio frame format stored in the circular buffer. An operation of the bit stream processing unit of FIG. 2 will now be described with reference to FIG. 7.

Referring to FIG. 7, when data $D_{i-1}$ of the (i−1)-th frame $F_{i-1}$ is processed, the processed data need not be stored into a buffer so that the bit stream processing unit operates in the first read mode. Then, a header $H_i$ of the i-th frame $F_i$ is decoded in order to process data of the i-th frame $F_i$. At this time, since data $D_i$ stored in the (i−1)-th frame $F_{i-1}$ will be required to complete the read operation, the bit stream processing unit changes its operational mode from the first mode to the second read mode. Then, by searching the header $H_i$ of the i-th frame $F_i$ and decoding a pointer MB, a location of the data $D_i$ stored in the (i−1)-th frame $F_{i-1}$ is identified. Thereafter, the apparatus retrieves the data from the identified location. Subsequently, the operational mode is changed to the first read mode, and the bit stream of the frame $F_i$ stored in the (i−1)-th frame $F_{i-1}$ is processed.

From the foregoing, persons of ordinary skill in the art will appreciate that a bit stream processing apparatus has been disclosed for storing a bit stream in one circular buffer without separately storing a header and a data of the bit stream.

Although preferred examples have been disclosed for illustrative purposes, those of ordinary skill in the art will appreciate that the scope of this patent is not limited to those examples. On the contrary, the scope of this patent extends to all structures and/or methods falling within the scope of the accompanying claims.

What is claimed is:

1. An apparatus for processing a bit stream that is coded in a plurality of frames, the apparatus comprising:

a circular buffer for storing a transmitted bit stream without separately storing header and data in each of the frames included in the transmitted bit stream;

a first register for storing a first value indicating a first read point of the bit stream stored in the circular buffer;

a first backup register for backing up the first value stored in the first register;

a second register for storing a second value indicating the number of bits to be read from the circular buffer;

a third register for storing a third value indicative of the number of bits to be ignored from the first read point;

a second backup register for backing up the third value stored in the third register;

an adder for adding the second value stored in the second register and the third value stored in the third register; and a controller responsive to the adder to determine the number of bits to be shifted to read desired data from the circular buffer without any restriction on the location of the desired data in the frames.

2. An apparatus as defined in claim 1, further comprising:

a fourth register for storing a fourth value indicating an address of the circular buffer where the transmitted bit stream is to be stored;

a fifth register for storing a fifth value retrieved from a first memory word in the circular buffer located adjacent a second memory word identified by the first read point;

a third backup register for backing up the fifth value stored in the fifth register;

a shifter for shifting a sixth value from the second memory word and a second value from the first memory word by the number of bits determined by the controller; and a masking circuit for masking unwanted bits.

3. An apparatus as defined in claim 2, wherein the apparatus has a first read mode and a second read mode wherein, in the first read mode, the first, third and fourth values in the first, the second, and the third backup registers respectively are updated simultaneously with data stored in one of the corresponding first, third and fifth registers, respectively, wherein, in the second read mode, the first, third and fifth values in the first, the second, and the third backup registers is not updated when the values in the first, the third and the fifth registers respectively is updated.

4. An apparatus as defined in claims 2 wherein the masking circuit identifies the unwanted bits based upon the second value stored in the second register.

5. An apparatus for reading from a circular buffer storing in a plurality of memory words without separately storing header and data of the transmitted bit stream that is coded in a plurality of frames, comprising:

a first storage device for storing a first value indicative of the desired number of bits to be read;

a second storage device for storing a second value indicative of a first bit to be read in a first memory word;

a shifter for receiving data stored in the first memory word and stored in a second memory word located adjacent the first memory word in the circular buffer; and a logic circuit in communication with the first and second storage devices for controlling the shifter to shift a number of bits specified by the first and second values in the first and second storage devices to align the first and second values in the shifter in a read position without any restriction on the location of the aligned in the frames.

6. An apparatus as defined in claim 5 wherein the logic circuit comprises:

an adder for summing the value stored in the first and second storage devices to develop a sum; and a controller for subtracting the sum from a predetermined number to develop the number of bits to be shifted by the shifter.

7. An apparatus as defined in claim 6 wherein the predetermined number is 32.

8. An apparatus as defined in claim 5 further comprising:

a third storage device for storing a value indicative of the first memory word containing to be read; and a fourth storage device for storing data contained in the second memory word.

9. An apparatus as defined in claim 5 further comprising a masking circuit for masking unwanted bits output by the shifter.

10. An apparatus for reading data from a circular buffer that stores data in a plurality of memory words, the apparatus comprising:

a first masking circuit for receiving at least two memory words from the circular buffer, the circular buffer storm the at least two memory words without separately storing a header and data of the memory words, the at least two memory being coded in a plurality of frames, the at least two memory words including data to be read, wherein, when a rightmost bit of the received memory words is not part of the to be read, the first masking circuit outputs a subset including the received memory words, which includes at least the data to be read but excludes at least the rightmost bit; and a second masking circuit for masking unwanted bits from the output of the first masking circuit and storing the number of unwanted bits.

11. An apparatus as defined in claim 10 wherein the first masking circuit comprises a shifter, and the shifter develops the subset by shifting the received data until the rightmost bit contains to be read without any restriction on the location of said rightmost bit in the frames.

12. An apparatus as defined in claim 10 wherein the second masking circuit masks unwanted bits by zeroing all bits to the left of the data to be read.

13. A method of reading data from a circular buffer storing data in a plurality of memory words without separately storing a header and data of the transmitted bit stream that is coded in a plurality of frames, comprising the steps of:

identifying at least one of the memory words containing data to be read;

identifying the number of bits to be read;

identifying a first bit to be read;

retrieving all in the memory words of the circular buffer storing data to be read;

inputting the retrieved to a shifter;

summing the number of bits to be read with the number of bits to be ignored adjacent the first bit to be read to develop a sum;

subtracting the sum from a predetermined number to determine a shift amount;

shifting the in the shifter by the shift amount to remove unwanted bits adjacent a last bit to be read without any restriction on the location of the last bit in the frames;

masking and storing unwanted bits adjacent the first bit to be read; and outputting the bits to be read.

14. A method as defined in claim 13 wherein the bits to be ignored are in front of the first bit to be read.

15. A method as defined in claim 13 wherein the masked unwanted bits are in front of the first bit to be read.

* * * * *

UNITED STATES PATENT AND TRADEMARK OFFICE
CERTIFICATE OF CORRECTION

PATENT NO. : 6,813,657 B2
DATED : November 2, 2004
INVENTOR(S) : Seung-June Kyoung It is certified that error appears in the above-identified patent and that said Letters Patent is hereby corrected as shown below:

Column 6,
Line 11, after "An apparatus for" please delete "reading from" and insert -- reading data from -- in its place.
Lines 11-12, after "a circular buffer" please delete "storing in" and insert -- storing data in -- in its place.
Line 21, please delete "and stored" and insert -- and data stored -- in its place
Line 29, after "location of the" please delete "aligned in" and insert -- aligned data in -- in its place
Line 54, after "the circular buffer" please delete "storm" and insert -- storing -- in its place.
Line 61, after "is not part of" please delete "the to" and insert -- the data to -- in its place.

Column 7,
Line 4, please delete "contains to" and insert -- contains data to -- in its place.
Line 17, after "retrieving" please delete "all in" and insert -- all data in -- in its place.

Column 8,
Line 1, after "inputting the" please delete "retrieved to" and insert -- retrieved data to -- in its place.
Line 7, after "shifting" please delete "the in" and insert -- the data in -- in its place.

Signed and Sealed this

Seventeenth Day of May, 2005

JON W. DUDAS
*Director of the United States Patent and Trademark Office*